(12) United States Patent
Geren

(10) Patent No.: US 6,307,758 B1
(45) Date of Patent: Oct. 23, 2001

(54) TRANSFORMER SECONDARY DISCONNECT

(75) Inventor: Michael D. Geren, Suwanee, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/704,454

(22) Filed: Nov. 2, 2000

(51) Int. Cl.$^7$ .................................................. H02M 3/335
(52) U.S. Cl. ....................................... 363/21.15; 361/106
(58) Field of Search ............................. 363/21.12, 21.15, 363/56.01, 56.09, 56.11; 361/106

(56) References Cited

U.S. PATENT DOCUMENTS

| | | | |
|---|---|---|---|
| 5,629,841 | * | 5/1997 | Attwood ............................. 363/21.16 |
| 5,914,865 | * | 6/1999 | Barbehenn et al. ................... 363/97 |
| 6,094,362 | * | 7/2000 | Domingo ............................. 363/56.1 |

* cited by examiner

Primary Examiner—Peter S. Wong
Assistant Examiner—Gary L. Laxton
(74) Attorney, Agent, or Firm—Philip H. Burrus, IV

(57) ABSTRACT

An isolation circuit for isolating a load node from a power supply secondary inductor includes a Zener diode and a PTC thermistor. The Zener diode electrically couples the load node to a ground and is capable of being in a substantially conductive state when the voltage between the load node and the ground exceeds a predetermined threshold and is also capable of being in a substantially non-conductive state when the voltage between the load node and the ground does not exceed the predetermined threshold. The Zener diode has a non-conductive temperature corresponding to when the Zener diode is in the substantially non-conductive state and a conductive temperature corresponding to when the Zener diode is in the substantially conductive state. The PTC thermistor electrically couples the power supply secondary inductor to the load. The PTC thermistor is in thermal communication with the Zener diode so that when the temperature of the Zener diode is at the non-conductive temperature the PTC thermistor is in a minimally resistive state and when the Zener diode is at the conductive temperature the PTC thermistor is in a maximally resistive state so as to be substantially non-conductive.

6 Claims, 1 Drawing Sheet

TRANSFORMER SECONDARY DISCONNECT

BACKGROUND OF THE INVENTION

1. Field of the Invention

The present invention relates to electrical power supplies and, more specifically, to power supplies employing over-voltage protection devices.

2. Description of the Prior Art

Existing power supplies, such as those used in lithium ion battery chargers, often employ a mechanism in which a pair of inductors are used to source current from a DC source to a load (ie., the charger). Typically, a primary inductor stores energy from the DC source in the form of a magnetic field and a control circuit intermittently interrupts current flow through the primary inductor, thereby causing the magnetic field to collapse. A portion of the magnetic field collapses onto a secondary inductor that is electrically coupled to the load. The collapsing magnetic field induces a current in the secondary inductor, thereby supplying current to the load. A feedback circuit is used to indicate to control circuit when the secondary side voltage is below a predetermined level. The control circuit then causes an interruption of the current through the primary inductor, thereby causing a transfer of energy to the secondary inductor. Once the control circuit senses that the voltage on the secondary side is above the predetermined level, current flow through the primary inductor is allowed to resume, thereby storing energy in anticipation of a subsequent energy transfer.

The feedback circuit may fail in such a way that the control circuit never senses the secondary side voltage rising above the predetermined level. Thus, energy will continue to be transferred to the secondary side, thereby causing the secondary side voltage to rise above the normal operating voltage of the load. Such a rise in voltage may be undesirable in battery chargers for various reasons.

Therefore, there is a need for a circuit that prevents over-voltage conditions on a power supply secondary side upon the occurrence of a failure of a feedback circuit.

DETAILED DESCRIPTION OF THE INVENTION

Figure 1:
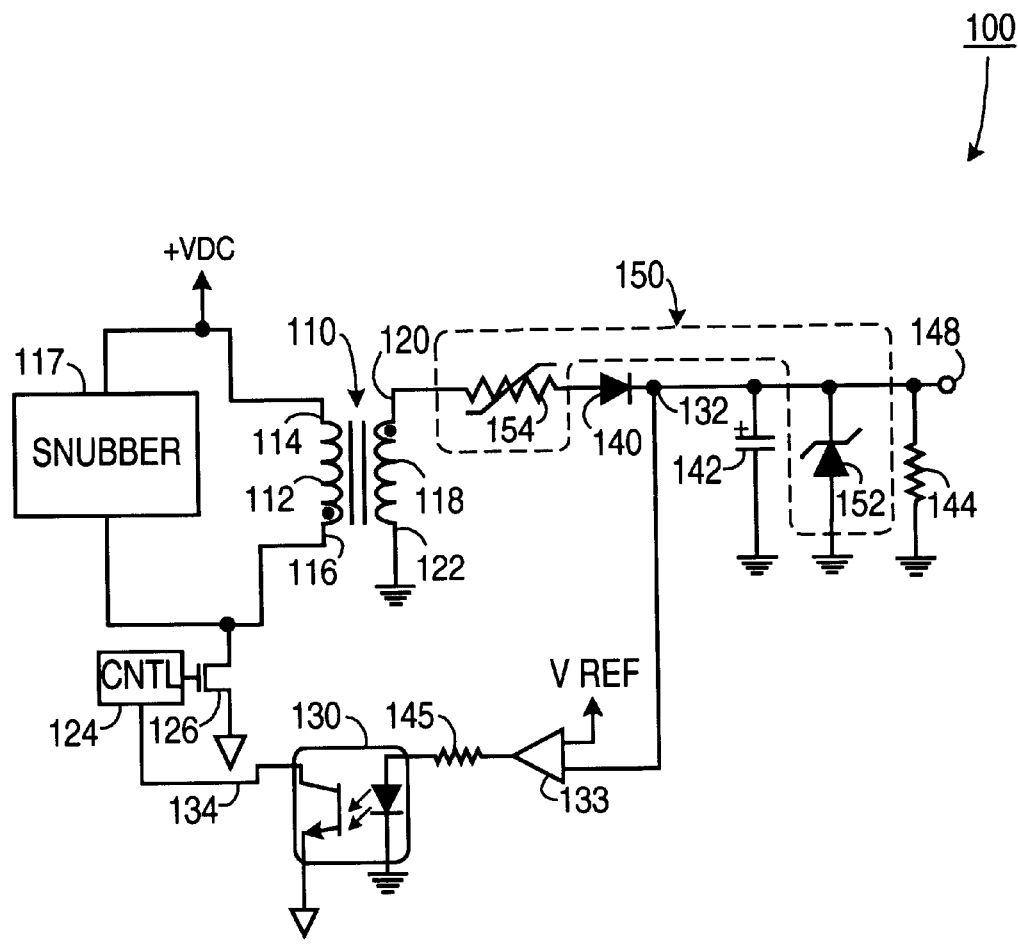
FIG. 1 is a schematic diagram of one embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment of the invention is a power supply circuit 100 for sourcing electric power from a DC source (VDC), which is typically a direct current taken from a bridge rectified alternating current, to a load node 148. Typically, the load node 148 would supply a load, such as a battery charger.

The power supply circuit 100 includes a pair of inductors 110 that act in the manner of a transformer. The pair of inductors 110 includes a primary inductor 112 and a secondary inductor 118. The primary inductor 112 has a first primary node 114 in electrical communication with the DC source and a second primary node 116. The secondary inductor 118 has a first secondary node 120, in electrical communication with the load node 148 and a second secondary node 122 in electrical communication with a secondary ground. Each of the pair of inductors 110 is wound around a separate portion of a common core so as to be in magnetic field communication with each other. The pair of inductors 110 is used to regulate the voltage being supplied to the load node 148. A snubber 117 may be placed in parallel with the primary inductor 112 to mitigate the effects of transients caused by energy stored in the leakage inductance.

A rectifying diode 140 is in series with the secondary inductor 118 and a capacitor 142 is in series with the rectifying diode 140 with respect to the current path from the first secondary node 120 to the secondary ground. A resistor 144 may also be placed in parallel with the capacitor 142.

A control switch 126 electrically couples the second primary node 116 to a primary ground and is capable of selectively decoupling the second primary node 116 from the primary ground. When the control switch 126 is closed, current flows from the DC source through the primary inductor 112 to ground and the primary inductor 112 stores energy in the form of a magnetic field. When the control switch 112 is opened, a portion of the magnetic field collapses onto the secondary inductor 118, thereby transferring the stored energy to the secondary inductor 118 in the form a current flowing therethrough.

An error amplifier 133 senses a secondary voltage between the secondary ground and a selected node 132 disposed between the first secondary node 120 and the load node 148. The error amplifier 133 generates a current control signal through resistor 145 that is representative of the secondary voltage. A feedback coupler 130, such as an optical isolator, transfers the current control signal from the secondary side to a secondary feedback signal 134.

A controller 124 is responsive to the secondary feedback signal 134 and selectively causes the control switch 126 to decouple the second primary node 116 from the primary ground when the secondary feedback signal 134 indicates that the selected node 132 has a voltage below a predetermined level, thereby inducing a current in the secondary inductor 118. For example, if a field effect transistor is used for the control switch 124, the controller 124 would be coupled to the gate of the field effect transistor so as to allow the controller to turn the field effect transistor "off" and "on."

The power supply circuit 100 includes an isolation circuit 150 for isolating the load node 148 from a power supply secondary inductor 118. The isolation circuit 150 includes a Zener diode 152 in parallel with the capacitor 142 and a positive temperature coefficient (PTC) thermistor 154 (e.g., a Polyswitch available from Raychem Corp.) in series with the secondary inductor 118. The PTC thermistor 154 is in thermal communication with the Zener diode 152 and, typically is disposed adjacent the Zener diode 152. The Zener diode 152 is in a substantially conductive state when the voltage between the load node 148 and the secondary ground exceeds a predetermined threshold (which would typically be based on the voltage handling characteristics of the load). When the voltage between the load node 148 and the secondary ground does not exceed the predetermined threshold, the Zener diode 152 is in a substantially non-conductive state. The Zener diode 152 has a non-conductive temperature corresponding to when the Zener diode 152 is in the substantially non-conductive state and a conductive temperature corresponding to when the Zener diode 152 is in the substantially conductive state. When the temperature of the Zener diode 152 is at the non-conductive temperature, the PTC thermistor 154 is in a conductive state and when the Zener diode 152 is at the conductive temperature, the PTC thermistor 154 is in a substantially non-conductive state.

In operation, if the feedback coupler 130 fails, the controller 124 will sense that the voltage at the selected node 132 on the secondary side is below the predetermined level, even though the voltage may be well above the predetermined level. This will cause the controller 124 to continue to drive current through the pair of inductors 110 in an attempt to bring the voltage at the selected node 132 above the predetermined level. Thus, the voltage at the selected node 132 will continue upward until the selected node 132 voltage reaches the breakdown voltage of the Zener diode 152. This causes the Zener diode 152 to begin conducting, which also causes the temperature of the Zener diode 152 to increase. This increase in temperature causes heat to be transferred to the adjacent PTC thermistor 154 and the temperature of the PTC thermistor 154 increases. As the temperature of the PTC thermistor 154 increases, the resistance of the PTC thermistor 154 increases until the PTC thermistor acts as an open circuit, thereby cutting off current to the load node 148. This prevents an over-voltage condition at the load node 148 from occurring. At this point, the voltage across the control switch 126 may build until a power transient on the primary side will cause the control switch 126 to fail open, thereby shutting down the power supply circuit 100.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. An isolation circuit for isolating a load node from a power supply secondary inductor, comprising:
   a. a Zener diode that electrically couples the load node to a ground, the Zener diode capable of being in a substantially conductive state when the voltage between the load node and the ground exceeds a predetermined threshold and capable of being in a substantially non-conductive state when the voltage between the load node and the ground does not exceed the predetermined threshold, wherein the Zener diode has a non-conductive temperature corresponding to when the Zener diode is in the substantially non-conductive state and a conductive temperature corresponding to when the Zener diode is in the substantially conductive state; and
   b. a PTC thermistor that electrically couples the power supply secondary inductor to the load, the PIC thermistor being in thermal communication with the Zener diode so that when the temperature of the Zener diode is at the non-conductive temperature the PTC thermistor is in a minimally resistive state and when the Zener diode is at the conductive temperature the PIC thermistor is in a maximally resistive state so as to be substantially non-conductive.

2. A power supply circuit for sourcing electric power from a DC source to a load node, comprising:
   a. a pair of inductors, including:
      i. a primary inductor having a first primary node in electrical communication with the DC source and a second primary node; and
      ii. a secondary inductor having a first secondary node, in electrical communication with the load node and a second secondary node in electrical communication with a secondary ground;
   each of the pair of inductors being wound around a separate portion of a common core so as to be in magnetic field communication with each other;
   b. a rectifying diode in series with the secondary inductor;
   c. a capacitor, in series with the rectifying diode with respect to the secondary ground;
   d. a control switch, electrically coupling the second primary node to a primary ground and capable of selectively decoupling the second primary node from the primary ground;
   e. a controller, responsive to a secondary feedback signal, that selectively causes the control switch to decouple the second primary node from the primary ground when the secondary feedback signal indicates that the first secondary node has a voltage below a predetermined level, thereby inducing a current in the secondary inductor;
   f. a Zener diode, in parallel with the capacitor, that is in a substantially conductive state when the voltage between the load node and the secondary ground exceeds a predetermined threshold and that is in a substantially non-conductive state when the voltage between the load node and the secondary ground does not exceed the predetermined threshold, the Zener diode having a non-conductive temperature corresponding to when the Zener diode is the substantially nonconductive state and a conductive temperature corresponding to when the Zener diode is in the substantially conductive state; and
   g. a PTC thermistor, in series with the secondary inductor, the PTC thermistor being in thermal communication with the Zener diode so that when the temperature of the Zener diode is at the non-conductive temperature the PTC thermistor is in a conductive state and when the Zener diode is at the conductive temperature the PTC thermistor is in a substantially non-conductive state.

3. The power supply circuit of claim 2, further comprising a feedback coupler that senses a secondary voltage between the secondary ground and a selected node between the first secondary node and the load node and that generates the secondary current feedback signal representative of the secondary voltage.

4. The power supply circuit of claim 3, wherein the feedback coupler comprises an optical isolation coupler.

5. The power supply circuit of claim 2, wherein the control switch comprises a field effect transistor having a gate that is responsive to the controller.

6. The power supply circuit of claim 2, wherein the PTC thermistor is disposed adjacent the Zener diode.

* * * * *